United States Patent [19]

Neff et al.

[11] 4,349,324
[45] Sep. 14, 1982

[54] INJECTION MOLDING MACHINE

[75] Inventors: Engelbert Neff, Zollikon; Friedrich Laimer, Reichenburg, both of Switzerland

[73] Assignee: Netstal-Maschinen AG, Switzerland

[21] Appl. No.: 168,664

[22] Filed: Jul. 11, 1980

[51] Int. Cl.³ .............................................. B29F 1/06
[52] U.S. Cl. .................................................... 425/149
[58] Field of Search ......................................... 425/149

[56] References Cited

U.S. PATENT DOCUMENTS

| | | | |
|---|---|---|---|
| 3,767,339 | 10/1973 | Hunkar | 425/149 X |
| 3,840,312 | 10/1974 | Paulson | 425/149 |
| 3,932,083 | 1/1976 | Boettner | 425/149 X |
| 4,120,631 | 10/1978 | Leutner | 425/149 X |
| 4,208,176 | 6/1980 | Solerno | 425/149 X |

*Primary Examiner*—Thomas P. Pavelko
*Attorney, Agent, or Firm*—McGlew and Tuttle

[57] ABSTRACT

An injection molding machine, comprises, an injection piston which is hydraulically actuated during programmed injection and dwell pressure phases. During a speed-controlled injection phase I, the pressure in a tool or mold cavity is measured and monitored. As soon as the pressure reaches an initial desired value, a pressure surge-free switching to the dwell pressure phase II is effected. During the dwell pressure phase, the pressure in the tool cavity is controlled and a pressure in a hydraulic cylinder for moving the injection piston is measured and monitored. A switch signal is produced from the tool pressure and the hydraulic pressure, by means of which a switching to a solidification phase III is effected without causing pressure surges. The actual pressure value at the instant of switching serves as the initial desired value for the solidification phase III. The hydraulic pressure is controlled during this phase.

13 Claims, 10 Drawing Figures

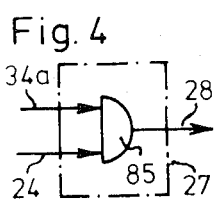
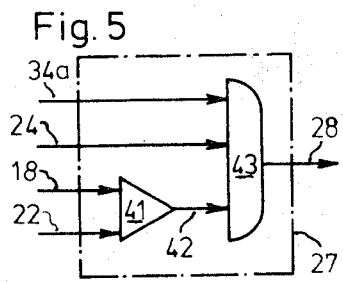
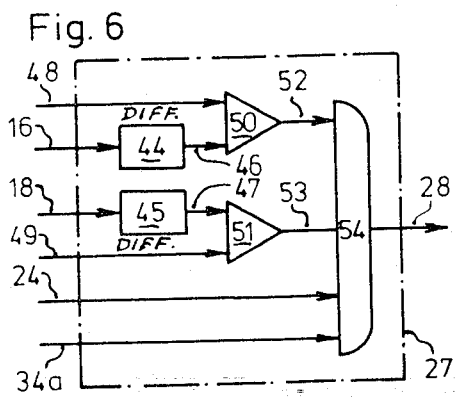
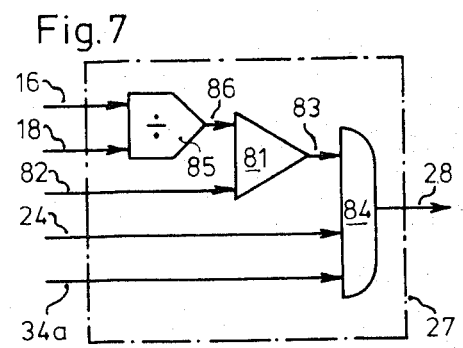
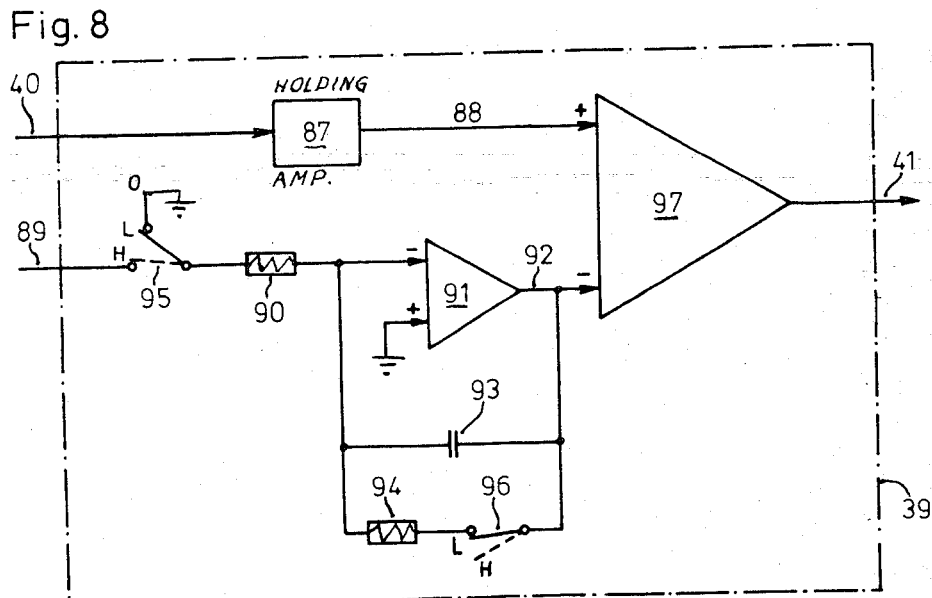

INJECTION MOLDING MACHINE

FIELD AND BACKGROUND OF THE INVENTION

The present invention relates to injection molding machines in general and, in particular, to a new and useful injecting molding machine having controls which permit smooth and pressure surge-free transition between a speed controlled ejection phase, a dwell pressure phase and a final solidification phase.

Injection molding machines are known in which the actual value of the pressure in the hydraulic cylinder is picked up by a sensor and compared with a settable desired value pattern, and the pressure in the hydraulic cylinder is controlled by means of a hydraulic actuator to make the actual and desired values coincide. Such a control device has the disadvantage that a varying viscosity of the plastic material to be injected results in varying pressures in the tool and, consequently, in irregularities in the quality of the molded piece.

Injection molding machines are also known in which the actual value of the pressure in the tool is picked up by a sensor and compared with a settable pattern of desired values, and the desired and actual values are forced to coincide by means of a hydraulic actuator. Such a control device has the disadvantage that, at the start of the dwell pressure phase, a pressure surge-free transition from the injection phase to the dwell pressure phase is not ensured. That is, in the prior art control device, the machine setter must preset a threshold value of the pressure at which the switching to the dwell pressure phase is to be effected. If this threshold value is too high or too low, pressure peaks or drops based on dynamic control actions are produced in the tool which may damage the molded piece. Another disadvantage of this prior art control device is that, with an extended dwell pressure period, the pressure transmission from the hydraulic cylinder to the sensor in the tool drops to zero, so that at the end of the dwell pressure time, the function of the control device is no longer satisfactory. The hydraulic pressure is controlled to either reach its maximum or to reach zero, which may load the tool or relieve it from load and, thereby, seriously damage the molded part.

In another prior art injection molding machine, the pressure is also picked up in the tool, compared with a settable pattern of the desired values and controlled by a corresponding hydraulic actuation to coincide therewith. To prevent the tool from being exposed to excessive or insufficient pressure in the final portion of the dwell pressure period, a switching to a steadily or linearly dropping hydraulic pressure is provided at a predetermined instant within the dwell pressure phase. This device is an improvement over the design described above. However, it has the disadvantage that pressure surges may occur during the switching, which again results in damage to the molded piece.

SUMMARY OF THE INVENTION

The present invention is directed to an injection molding machine of the above mentioned type, in which the switching from the injection phase to the dwell pressure phase is effected automatically and without pressure surges, and in which, upon a drop in the pressure transmission from the hydraulic cylinder to the sensor, the action is automatically switched, without causing pressure surges, to the control of the hydraulic pressure or the pressure of the molten mass received in the cylinder between the injection piston and the tool. Another objective of the invention is to minimize the setting expenses connected with passing from the injection phase to the dwell pressure phase and from the control of the tool pressure to the control of the hydraulic pressure or the plastic material pressure. The provided measures should enable the setter of the injection molding machine to adjust the optimum variation of the tool pressure and the hydraulic pressure substantially faster than with the prior art control devices.

An object of the present invention is to provide an injection molding machine, comprising, a molding tool defining a mold cavity, a material cylinder defining a vestibule communicating with the cavity, an injection piston movable in the material cylinder for injecting material from the vestibule into the cavity, material supply means connected to the cylinder for supplying material to be injected to the vestibule, actuator means operatively connected to the injection piston and material cylinder for moving the injection piston, control means connected to the actuator means for actuating the actuator means during an injection phase to move the injection piston to inject material into the cavity, during a dwell pressure phase to maintain a pressure in the cavity and during a solidification phase to permit solidification of the material in the cavity, first pressure monitoring means connected to the cavity and to the control means for measuring a cavity pressure, second pressure monitoring means connected to at least one of the cylinder and the vestibule and connected to the control means for measuring at least one of the piston pressure and the vestibule pressure, and program means connected to the control means for supplying the control means with preselected desired values for the cavity pressure, the dwell pressure phase time, and at least one of the piston pressure and vestibule pressure, the control means providing a smooth and pressure surge-free transition between the injection phase and the dwell pressure phase and between the dwell pressure phase and the solidification phase.

Another object of the present invention is to provide such an injection molding machine wherein the control means includes a holding amplifier circuit for holding an actual value of the cavity pressure during the end of the dwell pressure phase.

A further object of the present invention is to provide an injection molding machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its use, reference is made to the accompanying drawings and descriptive matter in which preferred embodiments of the invention are illustrated.

BRIEF DESCRIPTION OF THE DRAWINGS

In the Drawings:

FIGS. 4 through 8 are diagrams of embodiments of the control device of FIG. 2;

DESCRIPTION OF THE PREFERRED EMBODIMENTS

Figure 1:
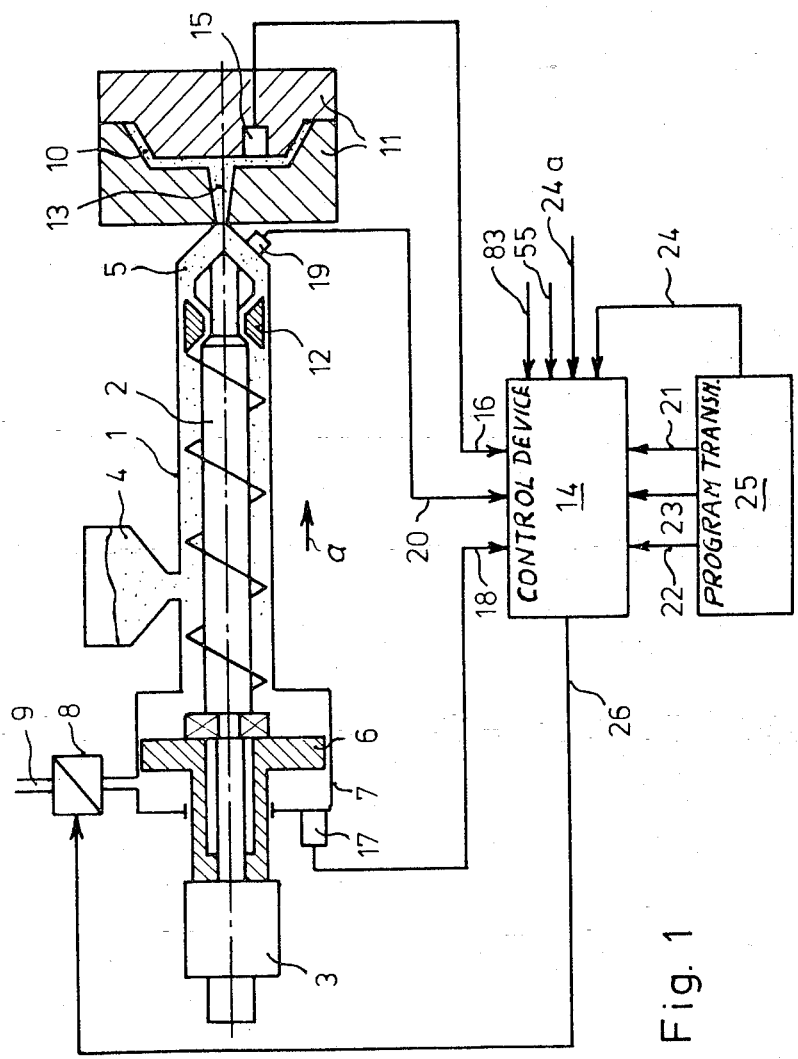
FIG. 1 is a diagrammatical illustration of an inventive injection molding machine.

FIG. 1 is a simplified vertical sectional view of a screw-type injection molding machine for plastics of a conventional design. An endless screw 2 is mounted for rotation and axial displacement in a screw cylinder 1. A drive motor 3 rotates screw 2 during the metering phase and displaces the plastic material from a funnel 4 into a vestibule 5 in front of the screw. At the same time, screw 2 is axially retracted, against the direction indicated by arrow a, so that vestibule 5 is enlarged in accordance with the amount of plastic fed in. By heating cylinder 1, and due to the friction in the plastic, the material is fused so that at the end of the metering operation, vestibule 5 contains a molten plastic mass capable of being injection molded.

During the following injection phase, a hydraulic piston 6, mounted in a hydraulic cylinder 7, is exposed to pressure oil through an electro-hydraulic actuator 8. Actuator 8 is connected at 9 to a pressure oil supply (not shown). Piston 6 is connected to screw 2 and pushes it to the right, in the direction of arrow a. During this injection phase, the molten mass of plastic flows from vestibule 5 into the cavity 10 of a tool 11. A check member 12 prevents the molten mass from flowing back. It is also possible, however, to perform the molding operation without a check member, for example, by rotating screw 2 to inject the mass.

As soon as cavity 10 is filled up, the dwell pressure phase starts while the molded piece in the tool of mold halves 11 cools down. To compensate for the shrinkage of the piece, the pressure in hydraulic cylinder 7 or in vestibule 5 is maintained so that additional molten plastic flows through gate 13 into tool cavity 10. This continues until the material in gate 13 solidifies. It is substantial for the quality of the molded parts to exactly observe a specified pressure variation in tool cavity 10. In particular, the weight and dimensions of the molded parts are determined by the pressure in the tool. In order to appropriately control the pressure in tool cavity 10, in hydraulic cylinder 7, and/or in vestibule 5, a control device 14 is provided.

Measuring signals or signal lines 16, 18 and 20 are supplied as inputs to control device 14. Signal 16 is proportional to the pressure in cavity 10, which is picked up by a pressure sensor 15. Signal 18 is proportional to the pressure in hydraulic cylinder 7, which is picked up by a pressure sensor 17. Pressure sensor 19 picks up the pressure in vestibule 5 and forms a signal on line 20 proportional thereto. Control device 14 is further supplied with reference signals 21, 22 and 23 which are produced by a settable program transmitter 25 as a function of the dwell pressure time. Depending on the design, one or more of the signals 18, 22, 20, 23 may be omitted, as desired.

In an advantageous embodiment of the invention, only pressure sensors 15 and 17 are needed and their signals are compared with reference signals 21, 22. In addition, control device 14 may be supplied with an adjustable time signal 24 delivered by program transmitter 25. A measuring signal 83 serves the purpose of controlling the injection phase and will be explained hereinafter in connection with FIG. 2. A control signal 24a serving to clear the switching from the injection phase to the dwell presure phase, and a control signal 55 will also be explained later in connection with FIG. 3.

Control device 14 produces an output signal 26 operating on electro-hydraulic actuator 8 and thus advantageously controls the pressure in hydraulic cylinder 7, in vestibule 5 and in tool cavity 10.

Figure 2:
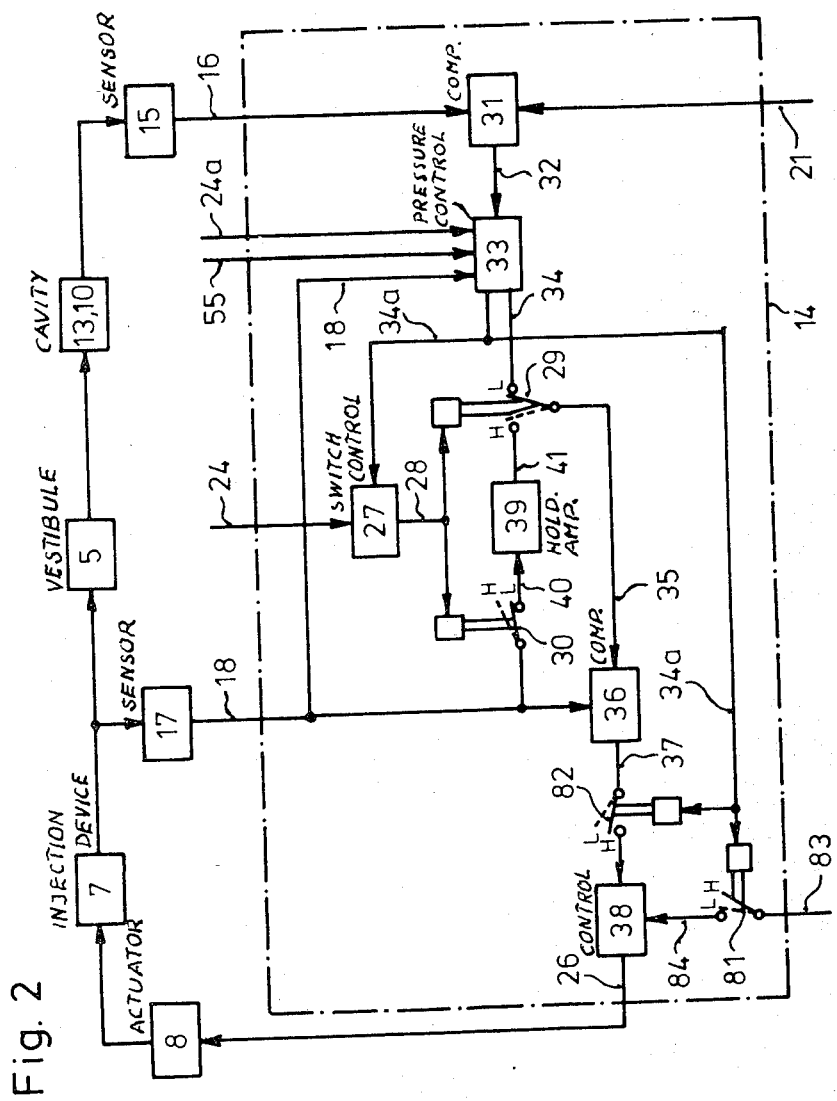
FIG. 2 is a circuit diagram of the control device for the dwell pressure, according to FIG. 1.

FIG. 2 is a diagram showing the signal flow in one embodiment of the controller 14.

During the injection phase, switches 81 and 82 are in their positions L. In a manner known per se and not shown, the screw advance is controlled. Signal or line 83 is the respective error signal.

At the start of the dwell pressure period, which start is notified by a control signal 34a transmitted to control device 27, control device 27 delivers a switch signal 28, to bring switches 29 and 30 into their positions L shown in FIG. 2. At the same time, switches 81 and 82 are brought into position H. This makes it possible to control the pressure in tool cavity 10 in the following manner: A comparator 31 forms the difference between the actual value signal 16 and the desired value signal 21 of the tool pressure. Differential signal 32 acts on a controller 33. Controller 33 is advantageously designed as a PI controller. Other controllers which are known in the art can also be used, however.

The controller output 34 is connected through switch 29 to the input 35 of another comparator 36. Comparator 36 forms the difference between actual value signal 18 and the desired value signal of the hydraulic pressure available at input 35. The differential signal 37 is supplied through switch 82 to a controller 38, advantageously a PID-action controller. Controllers with another type of action known in the art may also be used, however.

The output signal 26 of controller 38 controls the electro-hydraulic actuator 8 to the effect that the desired value 21 and the actual value 16 of the pressure in the tool cavity are forced to continuously correspond to each other. This can be effected as long as there is an operative connection between the output signal 26 and the input signal 16 of control device 14.

During this time, actual value signal 18 of the hydraulic pressure is applied through switch 30 to the input 40 of a holding amplifier 39. At a suitable instant of the dwell pressure period, control device 27 now produces a control signal 28 causing switches 29 and 30 to switch into their positions H.

Holding amplifier 39 thus holds the last value of the hydraulic pressure signal 18, applied prior to opening switch 30. Switch 29 connects the output 41 of holding amplifier 39 to the input 35 of comparator 36, so that the pressure in hydraulic cylinder 7 is brought to a value corresponding to the signal stored in holding amplifier 39. A smooth switching from the control of the pressure in the tool cavity 10 to the control of the pressure in hydraulic cylinder 7 is ensured by the provision that the last actual hydraulic pressure value prior to the switching serves as the desired value 41 after the switching. This results in the advantage that the setter of the injection molding machine is not required to adjust the desired hydraulic pressure.

According to FIG. 2, control device 27 produces the control signal 28 from the adjustable time signal 24 and the control signal 34a. The instant of switching after the start of the dwell pressure period can be selected as desired, as long as pressure is transmitted from the vestibule 5 to pressure sensor 15. Preferably, however, the switching is effected just before the pressure transmission ceases, thus right before the solidification of the material in gate 13. Control signals 24a and 55 will be explained in connection with FIG. 3.

Figure 3:
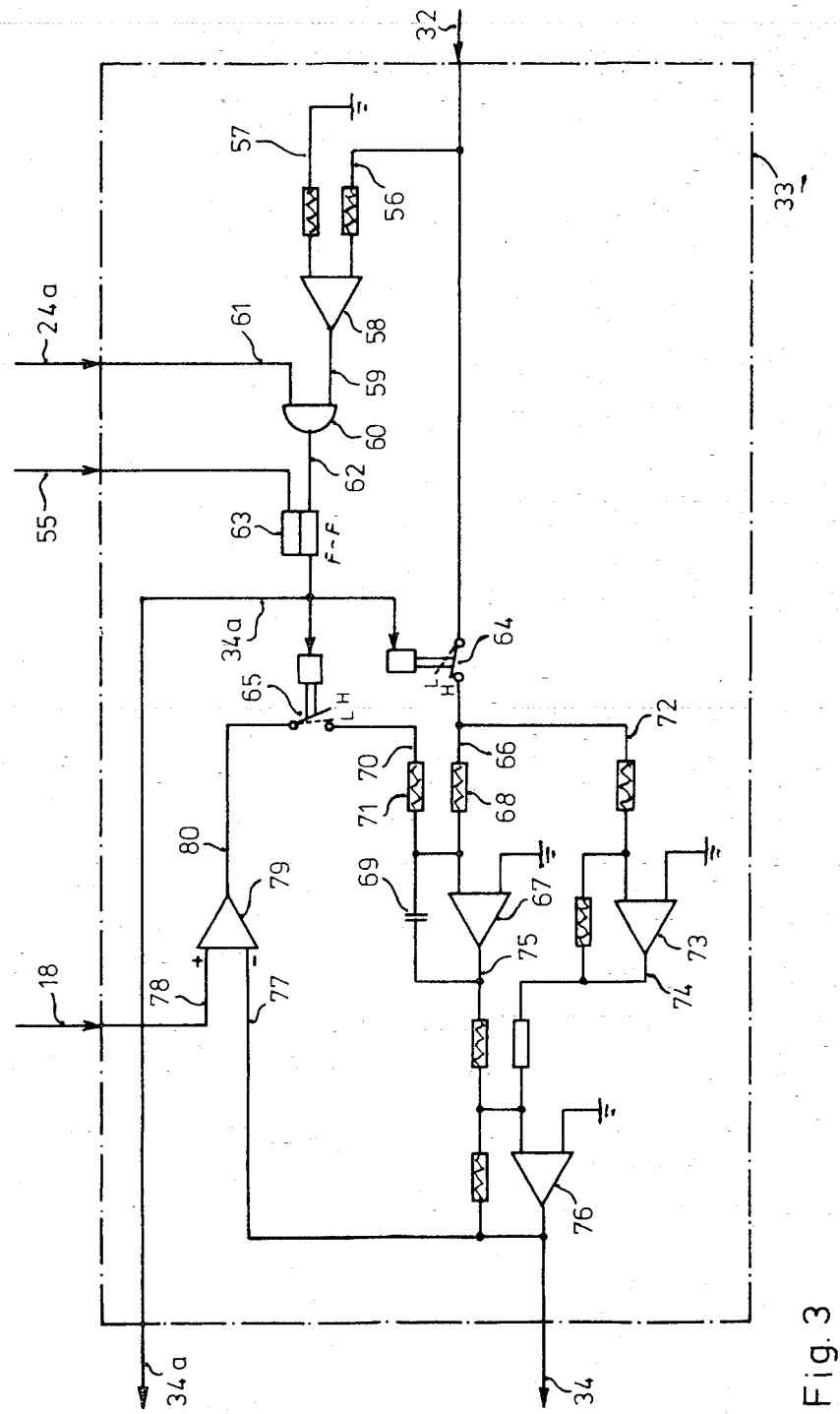
FIG. 3 is a similar diagram of the pressure controller of FIG. 2.

FIG. 3 is a section of FIG. 2 illustrating an embodiment of the controller 33, wherein the pressure signal 32 is applied to the input 56 of a switching comparator 58. The reference signal 57 of the comparator has the value zero. Comparator output 59 connects to an AND-element 60 whose second input 61 is enabled by a control signal 24a. The output 62 of AND-element 60 is applied to a flip-flop 63 and the output signal 34a of the flip-flop controls switches 64 and 65. In its position H, a switch 64 conducts input signal 32 to the input 66 of an operational amplifier 67 and to the input 72 of an operational amplifier 73. The output signals 74 and 75 are added to each other by means of an adding amplifier 76.

With switches 64, 65 in their H position, the shown circuit of amplifiers 67, 73, 76 acts as a PI controller. Output 34 connects to the input 77 of a differential amplifier 79. In this amplifier, the output signal 34 is compared with the actual value of the hydraulic pressure 18 which is applied to input 78 of the amplifier. The output signal 80 is supplied to the input 70 of amplifier 67 as long as switch 65 is in its position L.

The functions of controller 33 are as follows: during the injection phase, switches 29, 30, 64, 65, 81 and 82 are in their L positions (FIGS. 2 and 3). With this position, controller 38 controls the speed of the screw advance. The signal 83 is formed of the difference between the desired and the actual values of the screw advance speed (not shown).

The line 83 with switch 81 line 84 and controller 38 thus form speed control means for controlling the pressure applied to the cylinder 7 (and thus the cylinder speed) using the difference between an actual speed and a desired speed during an injection phase. Due to the resistance to flow of the plastic melt in tool cavity 10, a definite hydraulic pressure is produced in cylinder 7, which is required for maintaining the controlled advance speed of the screw. This pressure is picked up by pressure sensor 17. During the injection phase, the hydraulic pressure signal 18 serves as the desired value for controller output 34. It is essential to charge capacitor 69 in a sufficiently short time to enable output 34 to follow the rapid variations of the hydraulic pressure. This is obtained by a suitable choice of resistors 68, 71 and capacitor 69, for example:

Capacitor 69: 2.2 μF
Resistor 68: 1.22 MΩ
Resistor 71: 1 KΩ

With the progressing filling of the tool, the pressure in tool cavity 10 increases and reaches at a certain instant the first, programmed desired value of the tool pressure. This means that signals 16 and 21 are identical with each other and differential signal 32 is zero. Consequently, comparator 58 switches and delivers the control signal 34a through AND-element 60 and flip-flop 63. The output may be enabled by means of signal 24a which, for example, is produced by a certain position of the screw or at the start of the injection phase. However, signal 24a and AND-element 60 may also be omitted.

Control signal 34a brings switches 64, 65, 81 and 82 into their H position. The tool pressure controlling circuit is thereby smoothly closed and the dwell pressure phase is started. The switches, sensor 17, controller 33 and other elements which permit this switching are pressure control means, as opposed to the speed control means connected to line 83. The smooth switching, i.e., switching without pressure surges, is obtained on the basis of the following facts:

1. Prior to closing switch 64, inputs 66, 72 of the PI controller are at zero. Switch 65 is closed at the instant at which signal 32 is also zero so that controller output 34 does not change upon switching.

2. Capacitor 69 is charged by amplifier 79 to such an extent that at the instant of switching, controller output 34 equals the actual value 18 of the hydraulic pressure. In consequence, the output signal 37 of comparator 36 is also zero at the instant of switching. Therefore, controller output 26 does not change during the switching and no surges or pulse-like variations occur in actuator 8. This is a prerequisite for avoiding pressure peaks in the hydraulic system and the tool and, thereby, for an optimum quality of the molded pieces.

Signal 55 is intended for resetting flip-flop 63 at the end of the dwell pressure phase.

FIG. 4 shows a simple embodiment of control device 27. The adjustable time signal 24 is combined with control signal 34a through AND-element 85. During the dwell pressure phase, control signal 34a=H and control signal 24=L. Therefore, output signal 28=L. Switches 29 and 30 of FIG. 2 are in their L position. The control circuit for the tool pressure is thereby closed. At the adjusted point of time, time signal 24=H and, therefore, output 28=H. Switching to the control of the hydraulic pressure is thereby accomplished.

FIG. 5 shows another advantageous embodiment of the inventive control device 27.

A switching comparator 41 compares actual value signal 18 of the hydraulic pressure with a reference signal 22 which can be set in program transmitter 25 and varies in time in any way selected by the setter of the machine. A signal constant in time is to be considered simple and advantageous. As soon as signal 18 exceeds or equals the reference signal 22, comparator 41 switches and transmits the switch signal 42 to AND-element 43. Time signal 24 serves the purpose of enabling output 28 as from a point of time to be chosen by the setter of the machine.

FIG. 6 shows a further possibility of embodying control device 27. Differentiators 44 and 45 form derivatives in time 46, 47 of signals 16, 18 for the tool pressure $P_W$ and the hydraulic pressure $P_H$, respectively.

The following relations apply:

16 = $P_W$;
18 = $P_H$;
46 = $dp_W/dt$
47 = $dp_H/dt$

Switching comparators 50 and 51 compare signals 46, 47 with fixed or adjustable reference signals 48, 49. With 46 larger than or equal to signal 48, comparator 50 delivers a switch signal 52, with signal 47 smaller than or equal to signal 49, comparator 51 delivers a switch signal 53. As in the embodiment of FIG. 5, time signal 24 enables the switching as from a point of time chosen by the machine setter. AND-element 54 combines signals 52, 53, 24 and 34a to deliver the switch signal 28. The circuit operates as follows: the solidification in the gate can be determined by observing the variations in time of the hydraulic pressure and the tool pressure. If the tool pressure decreases in spite of the increasing hydraulic pressure, the cause-to-effect connection between the hydraulic pressure and tool pressure is interrupted and the circuit of FIG. 6 produces a switch signal 28.

FIG. 7 shows another embodiment of control device 27. This circuit makes use of the tool pressure $P_W$-to-hydraulic pressure $P_H$ relation to produce a switch signal. A dividing circuit 85 forms the quotient of signals 18 and 16 so that $$86 = P_W/P_H.$$

Switching comparator 81 compares quotient 86 with a reference signal 82 and delivers an output signal 83 if 86 is smaller than 82. Time signal 24 again serves the purpose of clearing the switching operation, as seen in FIG. 5.

FIG. 8 is a section of FIG. 2 showing a developed embodiment of the holding amplifier circuit 39. Aside from the holding amplifier proper at 87, the circuit includes an intergrator, comprising an inverting amplifier 91, resistors 90 and 94, and a capacitor 93. Switches 95 and 96 permit the start and zeroing of the integrator. Adding amplifier 97 adds the output signal 88 of the holding amplifier to the output signal 92 of the integrator.

The circuit operates as follows: during the dwell pressure phase, the tool pressure is initially controlled. Switches 95 and 96 are in their L position.

The output signal 92 of the integrator is zero. Therefore, the integrator produces no effect during this phase and the output signal 41 of the circuit corresponds to the actual value of the hydraulic pressure. The switching to the control of the hydraulic pressure now takes place as described above in relation to FIG. 2. While controlling the hydraulic pressure, the integrator may be started at any instant fixedly predetermined or chosen by the machine setter. This is done by bringing switches 95 and 96 into their H position. The negative output signal 92 of the integrator is added to the constant output signal 88 of the holding amplifier and effects a linear drop in output signal 41. The steepness of the drop depends on resistor 90, capacitor 93 and input signal 89. Input signal 89 may be adjustable so that the machine setter may choose the optimum pressure drop for the respective molded piece. A prior art comparator circuit (not shown) ensures that no negative rated pressure values 41 occur. This is obtained, for example, by returning switch 95 into its L position as soon as output signal 41 reaches the value zero.

Figure 9:
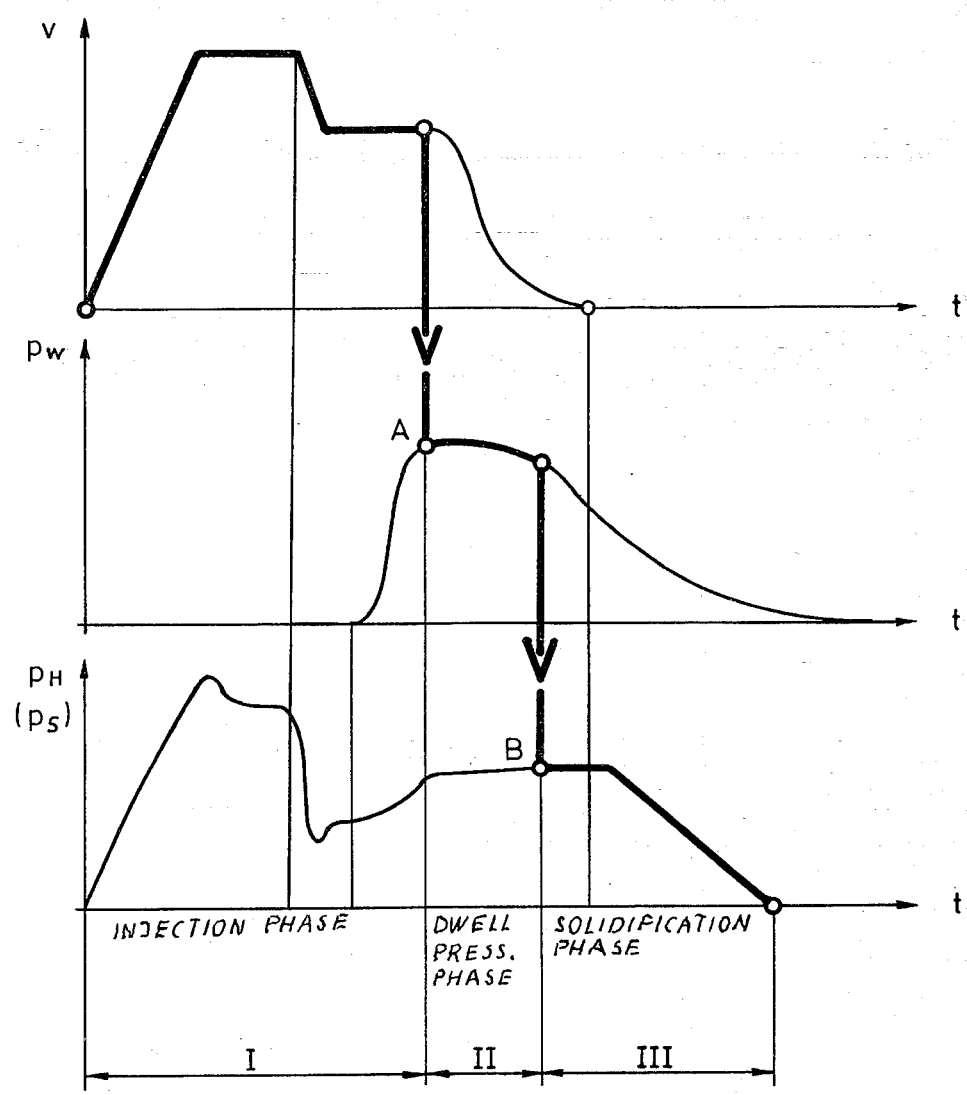
FIG. 9 shows three correlated graphs of the speed and pressure variation during the three phases of the injection molding operation by way of example.

FIG. 9 is a synoptical illustration of the three phases of the injection molding operation: During the injection phase I, the screw advance speed v is controlled. Simultaneously, the tool pressure $P_W$ is measured and monitored. As soon as the actual value of the tool pressure reaches the programmed initial desired value A, the switching to the dwell pressure phase II is effected. During this phase, the tool pressure $P_W$ is controlled and the hydraulic pressure $P_H$ and/or the pressure $P_S$ of the melt in the heating cylinder or the vestibule are measured and monitored.

A suitable switching criterion for the start of the solidification phase III is formed from pressures $P_W$, $P_H$ and/or $P_S$. During this phase, the hydraulic pressure $P_H$ or the melt pressure $P_S$ in the heating cylinder or the vestibule are controlled. The actual value of $P_H$ or $P_S$ at the point B serves as the starting desired value of the pressure program for solidification phase III.

Figure 10:
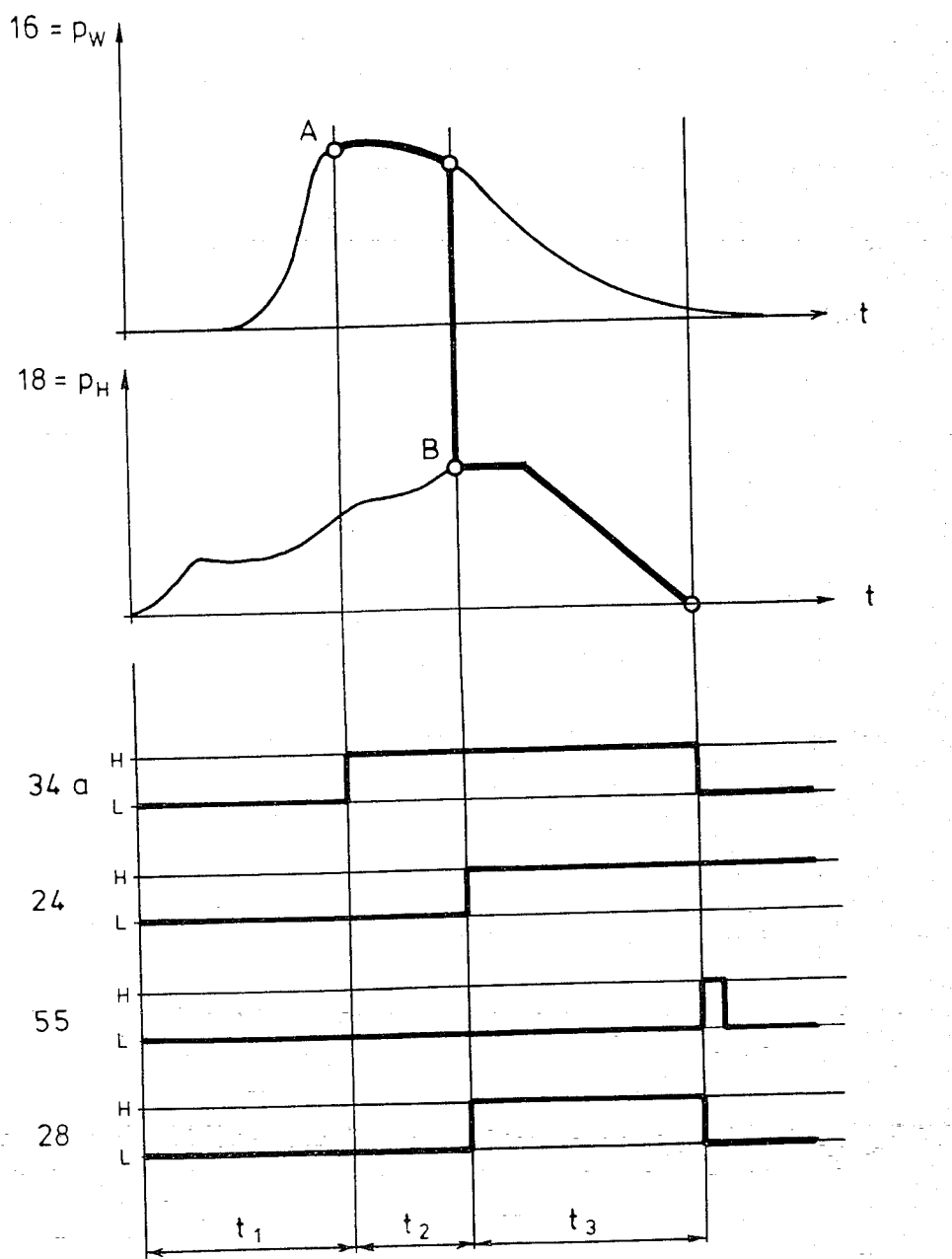
FIG. 10 shows, in a similar manner, the variation of the control signals.

FIG. 10 illustrates an example of variation in time of the control signals. During the time $t_1$, the screw advance speed is controlled. At the point A, the tool pressure reaches the programmed first desired value and control signal 34a passes from L to H and effects the smooth switching to the tool pressure control. This control remains effective up to the end of time $t_2$. Control device 24, for example, as seen in the design of FIG. 4, produces the control signal 28 from signal 34a and the programmed time signal 24. At the point B, signal 28 causes a smooth switching to the hydraulic pressure control. This control is effective up to the end of time $t_3$. The actual value of the hydraulic pressure at B serves to vary the desired value during the time $t_3$, for example, by means of the holding amplifier circuit 39, shown in FIG. 8. At the end of the time $t_3$, control signal 55 causes signal 34a to be applied to L so that control signal 28 is also applied to L and the dwell pressure phase is terminated.

The variations of the design of control device 27, shown in FIGS. 5 to 7, require programming of the desired value of the tool pressure such that, upon solidification in the gate, the hydraulic pressure increases. This is the case, for example, if the desired value of the tool pressure is constant in time. With a desired value of the tool pressure decreasing in time, however, a significantly dropping hydraulic pressure may result from the solidification. Such a case may also be mastered by the selective circuits of FIGS. 5 to 7 if the signs of the measuring and reference signals are appropriately chosen. A combination of the two cases is also possible.

Instead of hydraulic pressure signal 18, the signal 20 indicating the melt pressure may also be used for designing a control device 14, since the pressures in hydraulic cylinder 7 and in vestibule 5 are in causal relation with each other.

While specific embodiments of the invention have been shown and described in detail to illustrate the application of the principles of the invention, it will be understood that the invention may be embodied otherwise without departing from such principles.

What is claimed is:

1. An injection molding machine, comprising:
    a mold tool defining a mold cavity (10);
    a material cylinder (1) defining a vestibule (5) communicating with said cavity;
    an injection piston (2) movable in said material cylinder for injecting material from said vestibule into said cavity;
    material supply means (4) connected to said cylinder for supplying material to said vestibule;
    hydraulic actuator means (8) operatively connected to said injection piston and to said cylinder for moving said injection piston;
    control means (14) connected to said actuator means for actuating and controlling the pressure supplied by said actuator means during an injection phase (1) to move said injection piston to inject material into said cavity, during a means at the end of the dwell pressure phase used as an initial desired value for the solidification phase;
    said control means further including holding means (39) for receiving and holding the measured actual pressure value of said second pressure monitoring means during the injection phase, and said pressure control means having a tool pressure controller (33) for switching the actuator means to a dwell pressure phase when an initial desired cavity pressure (21) is reached and for maintaining pressure value (69) of said second pressure monitoring means during said injection phase as an initial desired value for said dwell phase, said holding means holding at least one of an actual cylinder and vestibule pressure when at least a part of the material in the cavity solidifies, said actual value being used to control the actuator means for the solidification phase.

2. An injection molding machine, according to claim 1, further including a third pressure monitoring means connected to the other of said cylinder and said vestibule for producing a signal corresponding to the other of said cylinder and vestibule pressures, said third pressure monitoring means connected to said control means.

3. An injection molding machine, according to claim 1, wherein said material cylinder includes a hydraulic cylinder part and a material part, said material supply means connected to said material cylinder part, said piston comprising a screw conveyor piston which is rotatable and axially movable in said material cylinder part, said actuator means including a hydraulic piston and hydraulic fluid supply device.

4. An injection molding machine, according to claim 1, wherein said control means further comprises a first comparator for comparing an actual cavity pressure from said first pressure monitoring means with a desired cavity value from said program means, an output of said first comparator connected to an input of said pressure controller, said pressure controller connected to said pressure monitoring means for receiving a signal therefrom, said pressure controller producing an output signal at the start of the dwell pressure period, a control device connected to the output of said pressure controller and receiving a selected value for the duration of the dwell pressure phase for producing an output at the end of the dwell pressure phase for initiating the solidification phase, said control device operatively connected to said holding means which comprise a holding amplifier for impressing said actual value of at least one of said cylinder and vestibule pressures thereon.

5. An injection molding machine, according to claim 4, wherein said control element comprises a comparator for comparing a signal from said second pressure monitoring means and a desired value for at least one of said cylinder and vestibule pressures from said program means, an output of said comparator forming a switch signal, and an AND-element having said switch signal as one input, said output of said pressure controller as another input, and a desired time duration of said dwell pressure phase from said program means as a third input.

6. An injection molding machine, according to claim 4, wherein said control device comprises a differentiator for receiving a signal from said first pressure monitoring means and a differentiator for receiving a signal from said pressure monitoring means, each differentiator having a differentiation output, a comparator connected to each of said differentiation outputs, each comparator having an additional input of a desired value for said cavity pressure and said at least one of said cylinder and vestibule pressures from said program means, and an AND-element having an input from each of said comparators, from said output of said pressure controller and from a time duration value for said dwell pressure phase from said program means.

7. An injection molding machine, according to claim 4, wherein said control device comprises a dividing element for dividing the signal from said first pressure monitoring means by the signal from said second pressure monitoring means to form an output, said program means forming a reference signal corresponding to a desired value of said dividing element output, a comparator receiving the output of said dividing element and said reference output to form an output and an AND-element receiving an output from said comparator, the output from said pressure controller and a dwell pressure phase desired time value from said program means.

8. An injection molding machine, according to claim 4, wherein said holding amplifier comprises a holding amplifier element for receiving a signal from said second pressure monitoring means, an integrator for receiving a signal from said program means corresponding to an optimum pressure drop for the cavity pressure, and an adding amplifier connected to an output of said holding amplifier element and said integrator.

9. An injection molding machine, according to claim 4, wherein said control means further includes a second comparator connected to an output of said holding amplifier and to said second pressure monitoring means for producing a differential output signal representing the difference between the actual value held by said holding amplifier and the value produced by said second pressure monitoring means, an actuator controller connected between the output of said second comparator and said actuator means for activating said actuator means for equalizing the cavity pressure sensed by said first pressure monitoring means with the desired cavity pressure value from said program means.

10. An injection molding machine, according to claim 4, wherein said pressure controller comprises a switching comparator for switching from the injection phase to the dwell pressure phase by producing a signal from the signal of said first comparator to produce a switching signal.

11. An injection molding machine, according to claim 10, wherein said control device comprises an AND-element having said switching signal as one input and said dwell pressure phase time duration signal as another input thereof.

12. An injection molding machine, according to claim 10, wherein said pressure controller further includes a comparator element connected to said second pressure monitoring means and to the output of said pressure controller which is fed back to said comparator element, and an amplifier connected to the output of said comparator element having an output, with an adding amplifier connected to the output of said amplifier and the output of said first comparator to produce said switching signal.

13. An injection molding machine, according to claim 12, wherein said pressure controller further includes an AND-element connected to an output of said switching comparator and to a clear control signal input, a flip-flop connected to an output of said AND-element and to a reset signal input for resetting said flip-flop at the end of a dwell pressure phase, said flip-flop forming said switching signal as an output thereof, a switch actuator connected to said flip-flop output and connected to a switch separating said comparator element from said amplifier.

* * * * *

UNITED STATES PATENT AND TRADEMARK OFFICE
CERTIFICATE OF CORRECTION

PATENT NO. : 4,349,324

DATED : September 14, 1982

INVENTOR(S) : Engelbert Neff, et al

It is certified that error appears in the above-identified patent and that said Letters Patent is hereby corrected as shown below:

```
            On the title page add:
--/30/      Foreign Application Priority Data
            July 16, 1979      Switzerland ....6606/79  --.
```

Signed and Sealed this

Eighteenth Day of October 1983

[SEAL]

Attest:

GERALD J. MOSSINGHOFF

Attesting Officer

Commissioner of Patents and Trademarks